United States Patent [19]

Howland

[11] Patent Number: 4,896,512

[45] Date of Patent: Jan. 30, 1990

[54] COMPARTMENTALIZED TRANSPORT REFRIGERATION SYSTEM

[75] Inventor: Leland L. Howland, Belle Plaine, Minn.

[73] Assignee: Thermo King Corporation, Minneapolis, Minn.

[21] Appl. No.: 301,408

[22] Filed: Jan. 25, 1989

[51] Int. Cl.$^4$ .............................................. B60H 1/32
[52] U.S. Cl. ...................................... 62/117; 62/152; 62/200; 62/239
[58] Field of Search ................. 62/199, 200, 117, 152, 62/239, 278

[56] References Cited

U.S. PATENT DOCUMENTS

| | | | |
|---|---|---|---|
| 4,419,866 | 12/1983 | Howland ............................ | 62/228.4 |
| 4,685,306 | 8/1987 | Howland et al. .................... | 62/117 |
| 4,706,468 | 11/1987 | Howland et al. .................... | 62/199 |
| 4,711,095 | 12/1987 | Howland et al. .................... | 62/117 |
| 4,712,383 | 12/1987 | Howland et al. .................... | 62/200 |

Primary Examiner—William E. Tapolcai
Attorney, Agent, or Firm—D. R. Lackey

[57] ABSTRACT

A compartmentalized transport refrigeration system including a refrigeration system having a compressor and first and second selectable refrigeration circuits normally associated with cooling and heating modes, respectively, a trailer having at least first and second compartments, a host evaporator, a condenser in the first refrigeration circuit, and at least one remote evaporator, with the evaporators each being associated with a trailer compartment. The second refrigeration circuit is selected when a remote evaporator requires heating, and when another evaporator requires cooling while a remote evaporator requires heating, refrigerant is returned to the compressor via the first refrigeration circuit and the evaporator requiring cooling, entering the first refrigeration circuit at a point which by-passes the normal condenser function, to cause the evaporator requiring heating to function as a condenser for the evaporator requiring cooling.

8 Claims, 4 Drawing Sheets

FIG.1

| MODE # | PS | HOST | REMOTE (R) | DIGITAL CONTROL ALGORITHM 1=OPEN 0=CLOSED X=DON'T CARE | | | | |
|---|---|---|---|---|---|---|---|---|
| | | | | LLS | HGS | RLLS | RHGS | RSLS |
| M1 | C | C | N | 1 | 0 | 0 | 0 | X |
| M4 | C | C | C | 1 | 0 | 1 | 0 | 1 |
| M7 | C | N | C | 0 | 0 | 1 | 0 | 1 |
| M8 | H | H | N | 1 | 1 | 0 | 0 | X |
| M10 | H | N | H | 0 | 0 | 1 | 1 | 1 |
| M14 | H | C | H | 1 | 0 | X | 1 | 0 |

FIG. 2

| MODE # | PS | HOST | 1ST REMOTE (R) | 2ND REMOTE (2R) | DIGITAL CONTROL ALGORITHM 1=OPEN 0=CLOSED X=DON'T CARE | | | | | | | |
|---|---|---|---|---|---|---|---|---|---|---|---|---|
| | | | | | LLS | HGS | RLLS | RHGS | RSLS | 2RLLS | 2RHGS | 2RSLS |
| M 1' | C | C | N | N | 1 | 0 | 0 | 0 | X | 0 | 0 | X |
| M 2" | C | C | N | C | 1 | 0 | 0 | 0 | X | 1 | 0 | 1 |
| M 3 | C | C | C | C | 1 | 0 | 1 | 0 | 1 | 1 | 0 | 1 |
| M 4' | C | C | C | N | 1 | 0 | 1 | 0 | 1 | 0 | 0 | X |
| M 5 | C | N | C | C | 0 | 0 | 1 | 0 | 1 | 1 | 0 | 1 |
| M 6" | C | N | N | C | 0 | 0 | 0 | 0 | X | 1 | 0 | 1 |
| M 7' | C | N | C | N | 0 | 0 | 1 | 0 | 1 | 0 | 0 | X |
| M 8' | H | H | N | N | 1 | 1 | 0 | 0 | X | 0 | 0 | X |
| M 9 | H | N | H | H | 0 | 0 | 1 | 1 | 1 | 1 | 1 | 0 |
| M 10' | H | N | H | N | 0 | 0 | 1 | 1 | 1 | 0 | 0 | X |
| M 11" | H | N | N | H | 0 | 0 | 0 | 0 | X | 1 | 1 | 0 |
| M 12 | H | N | H | C | 0 | 0 | 0 | 1 | 0 | 1 | 0 | 1 |
| M 13 | H | N | C | H | 0 | 0 | 1 | 0 | 1 | 0 | 1 | 0 |
| M 14' | H | C | H | N | 1 | 0 | 0 | 1 | 0 | 0 | 0 | X |
| M 15" | H | C | N | H | 1 | 0 | 0 | 0 | X | 0 | 1 | 0 |
| M 16 | H | C | H | C | 1 | 0 | 0 | 1 | 0 | 1 | 0 | 1 |
| M 17 | H | C | C | H | 1 | 0 | 1 | 0 | 1 | 0 | 1 | 0 |
| M 18 | H | C | H | H | 1 | 0 | 0 | 1 | 0 | 0 | 1 | 0 |

FIG. 4

COMPARTMENTALIZED TRANSPORT REFRIGERATION SYSTEM

TECHNICAL FIELD

The invention relates to transport refrigeration systems for trailers having more than one compartment to be conditioned.

BACKROUND ART

U.S. Pats. Nos. 4,685,306; 4,706,468; 4,711,095; and 4,712,383, which are assigned to the same assignee as the present application, all disclose compartmentalized transport refrigeration systems which include a host evaporator and a remote evaporator. When the remote evaporator requires heat the host evaporator can be in a cooling mode, with the refrigerant circuit for the host evaporator including a compressor having discharge and suction ports, a condenser, a receiver, and an expansion valve. This refrigerant circuit is the first of two refrigerant circuits selectable by a refrigerant circuit selecting valve, which, when host evaporator cooling is required, directs hot gas from the compressor discharge port to the circuit which includes the condenser. When heating is required by the host evaporator, the circuit selecting valve directs the hot gas from the compressor discharge port to the host evaporator.

The remote evaporator is connected to the refrigeration system associated with the host evaporator via controllable valves at predetermined locations, with a hot gas connection to the host system being made between the compressor discharge and the refrigerant circuit selecting valve.

It would be desirable, and it is an object of the present invention, to increase the efficiency of the heating mode when a remote evaporator requires heating while another evaporator requires cooling.

DISCLOSURE OF THE INVENTION

Briefly, the present invention improves upon the efficiency of a compartmentalized transport refrigeration system by causing a remote evaporator requiring heat to function as a condenser for an evaporator requiring cooling. Thus, instead of rejecting heat in the normal condenser function, the normal condenser is by-passed. Hot gas leaving the compressor discharge port is directed into a remote evaporator requiring heat, and the refrigerant leaving the remote evaporator is directed into the receiver. The refrigerant then proceeds to the evaporator which requires cooling. If the remote evaporator requiring heat is satisfied before the evaporator requiring cooling is satisfied, the hot compressor discharge gas is directed into the normal condenser. If the evaporator requiring cooling is satisfied before the remote evaporator requiring heat, the refrigerant leaving the remote evaporator is returned to the compressor instead of being directed into the receiver.

BRIEF DESCRIPTION OF THE DRAWINGS

The invention will become more apparent by reading the following detailed description in conjunction with the drawings, which are shown by way of example only, wherein:

FIG. 1 illustrates a compartmentalized refrigeration system constructed according to an embodiment of the invention which includes a host evaporator and one remote evaporator;

FIG. 2 is chart which illustrates the various heating and cooling modes obtainable with the system shown in FIG. 1, including a digital control algorithm for each mode;

FIG. 4 is chart which illustrates the various heating and cooling modes obtainable with the system shown in FIG. 3, including a digital control algorithm for each mode.

DESCRIPTION OF PREFERRED EMBODIMENTS

Figure 3:
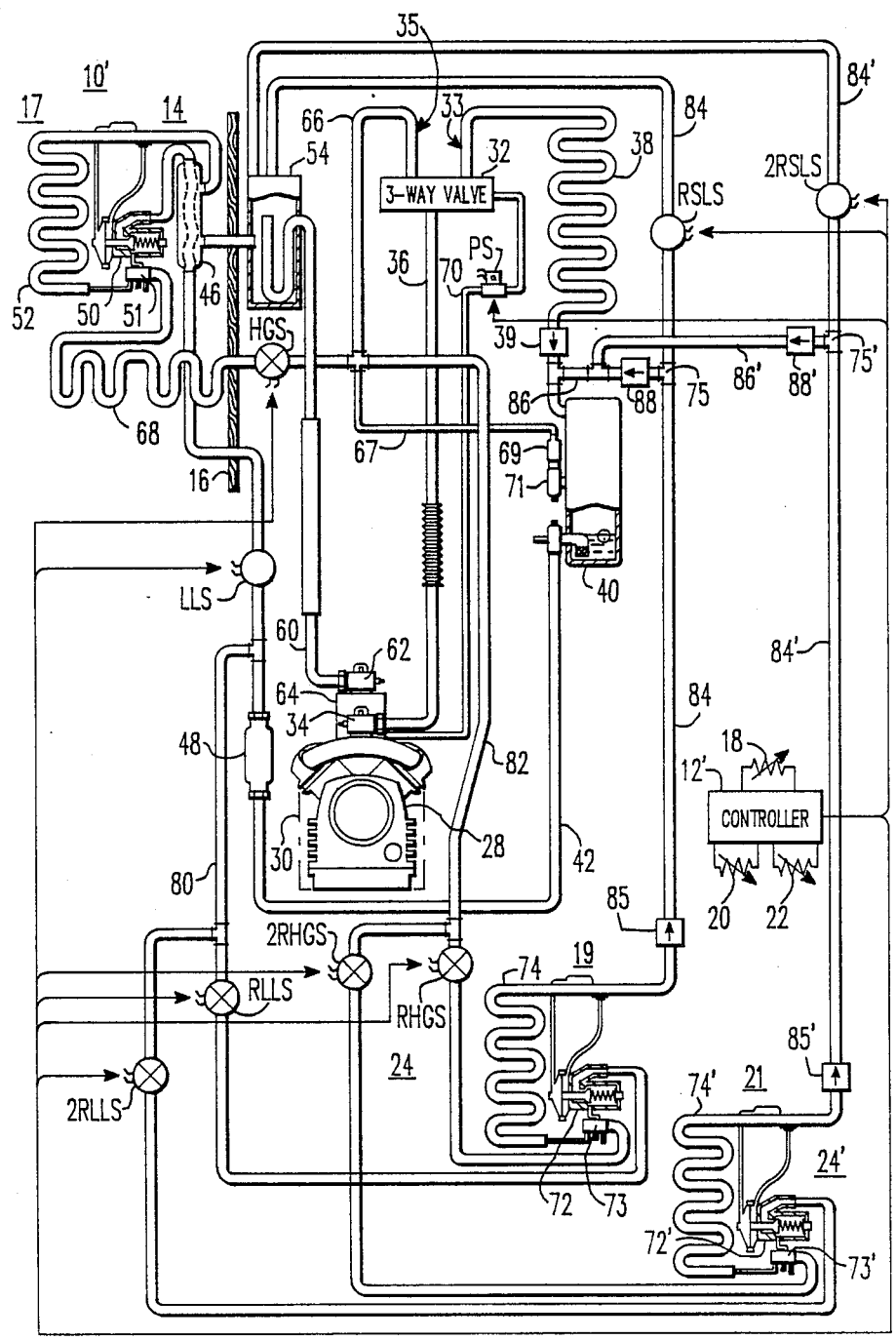
FIG. 3 illustrates a compartmentalized refrigeration system constructed according to another embodiment of the invention which includes a host evaporator and first and second remote evaporators.

The hereinbefore mentioned U.S. Pats. Nos. 4,685,306 and 4,706,468 are incorporated into the specification of the present application by reference, as they teach control which may be modified to perform the functions of the present invention. Components in the present application which may be the same as in the incorporated application will be referred to with the same reference numerals.

Figure 1:
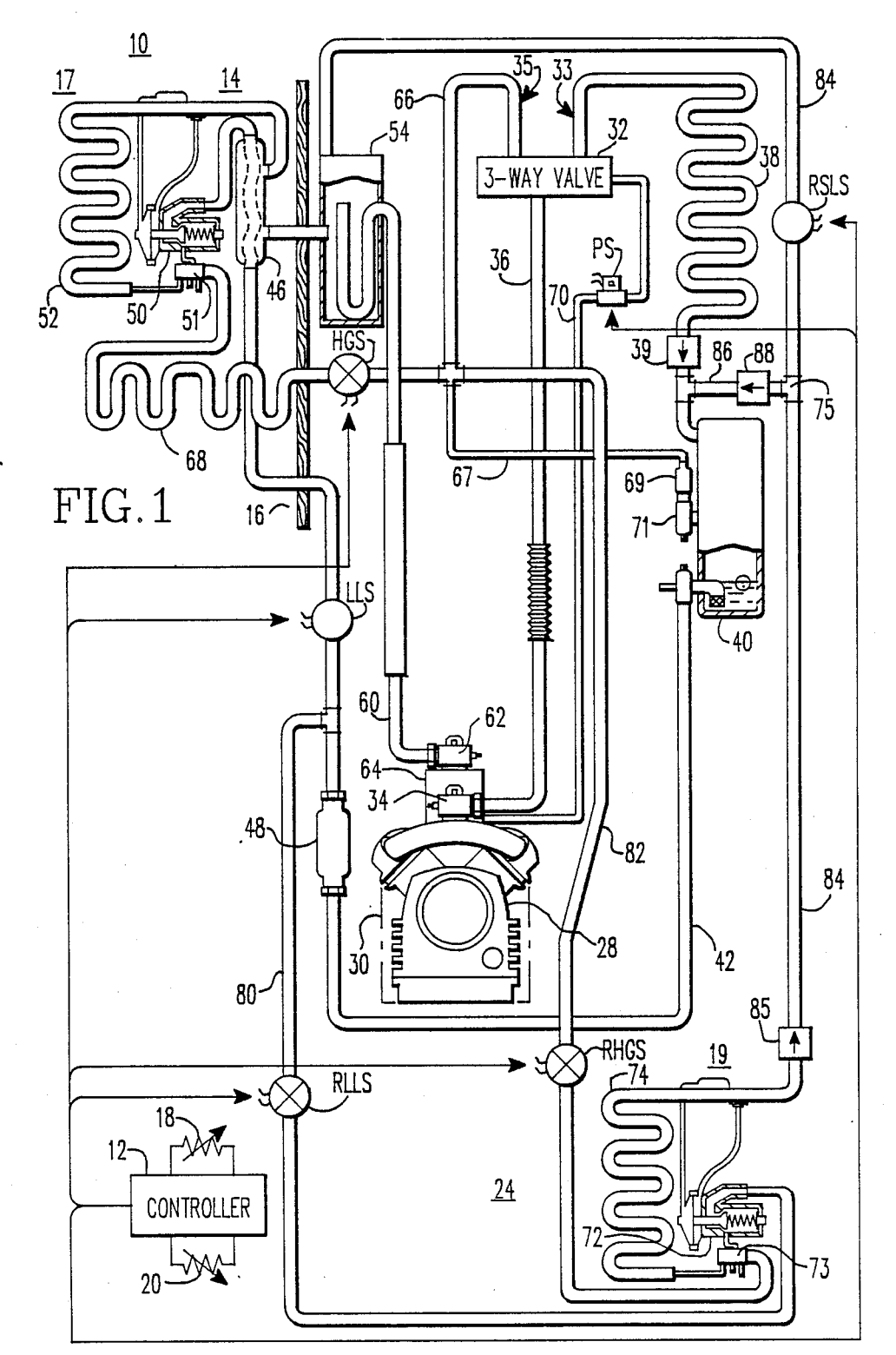

Referring now to the drawings, and to FIG. 1 in particular, there is shown a schematic piping diagram of a transport refrigeration system 10. System 10 is associated with a trailer 16 having first and second compartments 17 and 19, respectively, to be conditioned. System 10 is under the control of a temperature controller 12 having temperature sensors 18 and 20 respectively disposed in compartments 17 and 19. Transport refrigeration system 10 includes a host refrigeration unit 14 which is controlled in response to sensor 18, a remote evaporator unit 24 which is controlled in response to sensor 20, and piping between the two units. FIG. 1 also illustrates a plurality of controllable solenoid valves having open and closed positions, and check valves. While the solenoid valves will be referred to as having a specified normal de-energized position, it will be understood that the opposite de-energized position may be used by merely modifying the associated control accordingly.

The host refrigeration unit 14 includes closed fluid circuits which include a refrigerant compressor 28 driven by a prime mover such as an internal combustion engine, indicated generally by broken outline 30. Discharge ports of compressor 28 are connected to a refrigeration circuit selecting valve means 32 via a discharge service valve 34 and a hot gas line 36. Valve means 32 may be a three-way valve, as illustrated, or two separate valves, as desired. For the purposes of this description, valve means 32 will be referred to as a three-way valve.

Three-way valve 32 is controlled by a pilot solenoid valve PS. When pilot solenoid valve PS is de-energized, three-way valve 32 is biased to a position which directs hot gas from compressor 28 into a first refrigerant circuit 33. When pilot solenoid valve PS is energized, compressor pressure via conduit 70 operates three-way valve 32 to a position which directs hot gas from compressor 28 into a second refrigerant circuit 35. The first refrigerant circuit 33 directs refrigerant in a closed loop which includes a condenser 38, a check valve 39, a receiver 40, a liquid line 42, a drier 48, a normally open, liquid line solenoid valve LLS, a first path through a heat exchanger 46, an expansion valve 50, a distributor 51, an evaporator 52, a second path through heat exchanger 46, an accumulator 54, and a suction line 60 which is connected to the suction port of compressor 28 via a suction line service valve 62 and a suction throttling valve 64. Accumulator 54 is not essential and may be eliminated. The use of accumulator 54 assures vaporized refrigerant for compressor 28 in systems and/or ambients where slugging may be a problem. The first refrigerant circuit 33 is the normal cooling circuit for the host refrigeration unit 14, removing heat from a trailer compartment associated with host evaporator 52 and temperature sensor 18, and rejecting heat in condenser 38 to ambient.

When host evaporator 52 requires heat for defrosting, or for holding a selected set point temperature, as detected by sensor 18, controller 12 energizes pilot solenoid valve PS. Pressure from compressor 28 now operates three-way valve 32 which directs hot compressor gas to the second refrigerant circuit 35. The second refrigerant circuit 35 includes hot gas line 66, a normally closed hot gas solenoid valve HGS, a defrost pan heater 68, distributor 51, evaporator 52, the second path through heat exchanger 46, accumulator 54, and back to compressor 28 via suction line 60. A receiver pressurizing tap 67 extends from hot gas line 66 to receiver 40 via a check valve 69 and service valve 71.

The remote evaporator unit 24 includes an expansion valve 72, a distributor 73 and an evaporator 74. Expansion valve 72 is connected to liquid line 42, between drier 48 and liquid line solenoid valve LLS, via a remote liquid line 80 which includes a normally closed remote liquid line solenoid valve RLLS. Distributor 73 is connected to hot gas line 66 via a remote hot gas line 82 which includes a normally closed remote hot gas line solenoid valve RHGS. It is important to note that the connection to the host hot gas line by remote unit 24 is in the second refrigerant circuit 35. This is unlike the incorporated patents, which connect remote unit 24 to hot gas line 36, between compressor 28 and three-way valve 32. The outlet of remote evaporator 74 is connected to a tee 75 via a remote suction line 84 which includes a check valve 85. One outlet of tee 75 is connected to the inlet of receiver 40 via a conduit 86 which includes a check valve 88. The remaining outlet of tee 75 is connected to the accumulator 54 via a continuation of remote suction line 84 which includes a normally open remote suction line solenoid valve RSLS.

FIG. 2 is a chart 92 which illustrates the operation of refrigeration system 10 under the direction of controller 12. Six different operating modes are illustrated, each being contained in a different horizontal line across chart 92, with the position of the pilot solenoid being illustrated with a "C" for the cooling position which selects the first refrigerant circuit 33, and with an "H" for the heating position which selects the, second refrigerant circuit 35. The cooling, heating, and null modes of the host unit 14 and remote unit 24 are indicated with a "C", "H" and "N", respectively. The positions of the liquid line solenoid valve LLS, the hot gas solenoid valve HGS, the remote liquid line solenoid valve RLLS, the remote hot gas line solenoid valve RHGS, and the remote suction line solenoid valve RSLS, are indicated with a logic "1" for open, a logic "0" for closed, and "X" for "don't care". The logic levels thus form a digital control algorithm which may be used to program a microcomputer, or for determining the location of normally open an normally closed contacts of relay control, such as shown in the incorporated patents.

Modes M1, M4, and M7 are cooling modes in which the pilot solenoid PS is in the cooling position which selects the first refrigerant circuit 33. In mode M1, the host unit 14 is in cool, while the remote unit 24 is satisfied, or in null. In mode M4, both units are in cool. In mode M7, the host unit 14 is satisfied, while the remote unit 24 is in cool.

Modes M8, M10 and M14 are heating modes, with mode M14 also allowing host cooling to occur, as will be hereinafter explained. In mode M8 the remote unit is satisfied while the host unit is heating. While the remote unit is satisfied, the host will cycle back and forth between modes M1 and M8, to hold set point, unless controller 12 is arranged to shut the prime mover 30 and compressor 28 down when both are satisfied, as taught by my U.S. Pat. No. 4,419,866, which is assigned to the same assignee as the present application. In mode M10, the remote unit 24 requires heat, which, as explained in the incorporated applications, locks out host heating, such as by using the K4 lock-out relay set forth in the incorporated applications.

M14 is a mode which allows host cooling, notwithstanding that the pilot solenoid PS is in the position which normally only allows heating modes to occur. When remote unit 24 requires heat, sensed by sensor 20, controller 12 will energize the pilot solenoid valve PS and it will also open the remote hot gas solenoid RHGS, to direct hot gas from compressor 28 into hot gas line 66. Host heating will be locked out, so hot gas solenoid HGS will be closed, and the entire supply of hot gas from compressor 28 will be delivered to remote evaporator 74 via distributor 73. If the host evaporator 52 is satisfied, or is calling for heat, as sensed by sensor 18, controller 12 will maintain remote suction line valve RSLS in an open position, returning the refrigerant directly to compressor 28 via accumulator 54 and suction line 60. If sensor 18 calls for host cooling, instead of switching the three-way valve to the cooling position, which places condenser 38 in the active refrigerant circuit, and sending hot gas to the remote unit from hot gas line 36, the present invention maintains the three-way valve in the heating position. Controller 12 then closes the remote suction line solenoid RSLS, to force refrigerant into the first refrigerant circuit at a point which by-passes condenser 38, i.e., at the inlet of receiver 40, via conduit 86 and check valve 88. The remote evaporator 74 now functions as a condenser for the host evaporator, and instead of rejecting heat from the normal condenser 38 into ambient, the heat picked up in evaporator 52 is delivered to evaporator 74, to facilitate the heating of evaporator 74 while improving the efficiency of the refrigeration cycle.

If the host evaporator 52 becomes satisfied before the remote evaporator 74 is satisfied, controller 12 simply opens remote suction line valve RSLS, switching from a mode M14 to mode M10. If the remote evaporator becomes satisfied before the host evaporator 52 is satisfied, controller 12 closes remote hot gas solenoid RHGS and switches three-way valve 32 to the cooling position, and the system 10 operates in mode M1.

The present invention also may be easily extended to three temperature systems, enabling many more control options, such as having one remote evaporator function as a condenser for another remote evaporator, i.e., cooling in one remote evaporator, while heating in the other remote evaporator. The host may be in null or in cool. In the latter instance heat picked up in two evaporators will be added to the remote evaporator requiring heat, while the normal condenser is by-passed. A three temperature system requires a check valve for each evaporator to insure the presence of a check valve in the suction line of all evaporators operating at a lower suction pressure than the evaporator(s) which is(are) heating or defrosting. The check valves should be located as close as possible to the condenser, so two remote evaporator suction lines will be required. One liquid line and one hot gas line may supply the respective solenoid valves in each remote evaporator section. A three-temperature embodiment of the invention is set forth in FIGS. 3 and 4.

More specifically, FIG. 3 is a refrigeration and control diagram of a transport refrigeration system 10' which is similar to system 10 shown in FIG. 1, except modified to include a second remote evaporator unit 24' which has a sensor 22 associated with a third compartment 21 of trailer 16. Like components in FIGS. 1 and 3 are referred to with like reference numerals. Components of the second remote evaporator are identified with the same reference numerals used for like components of the first remote evaporator, except for a prime mark.

The second remote evaporator 24' has its expansion valve 72' connected to the host liquid line 42 via a normally closed second remote liquid line solenoid 2RLLS and remote liquid line 80.

The distributor 73' of the second remote unit 24' is connected to the host hot gas line 66 via a normally closed second remote hot gas line solenoid 2RHGS and remote hot gas line 82.

The output of the second remote unit 24' is connected to a tee 75' via a check valve 85'. One outlet of tee 75' is connected to the inlet of receiver 40 via a line 86' which includes a check valve 88', and the remaining outlet of tee 75' is connected to accumulator 54 via a continuation of the second remote suction line 84' which includes a normally open second remote suction line solenoid valve 2RSLS.

FIG. 4 is a chart 94 similar to the chart 92 of FIG. 2, setting forth the various combinations of heating and cooling modes made possible by the invention. When the second remote unit 24' is satisfied and is in null, the host and first remote operate the same as in the first embodiment, and these modes have been identified with the same number as the similar modes of the first embodiment, except for a prime mark. Similarly, when the first remote unit is in null, the host and second remote units operate the same as in the first embodiment, and these modes are identified with a double prime mark.

Mode M3 is a cooling mode, with pilot solenoid PS being in the cooling position and with all three evaporators in a cooling mode. If the host becomes satisfied, it may switch to null, i.e., mode M5.

Mode M9 is a heating mode, with pilot solenoid PS being in the heating position and with both remote units being in a heating mode. When any remote unit is in a heating mode, host heating is locked out.

Modes M12, M13, M16, M17 and M18 are new modes made possible by the teachings of the invention. Mode M12 and mode M13 are similar, having one of the remote units in a heating mode, which locks out host heating (HGS is closed), and the other remote unit is allowed to go into a cooling mode, notwithstanding the pilot solenoid PS being in the position normally associated only with heating functions. The host unit does not require cooling in these two modes. In this situation, the remote unit requiring heating functions as a condenser for the remote unit requiring cooling.

Controller 12' accomplishes these modes by closing the remote liquid line solenoid of the remote unit requiring heat. The remote liquid line solenoid associated with the remote unit requiring cooling is opened, the remote hot gas line solenoid associated with the remote unit requiring heating is opened, and the host liquid line solenoid LLS is closed.

Modes 16 and 17 are similar to one another, each having one remote unit in a heating mode and one in a cooling mode, while the host unit 14 is in a cooling mode. The remote unit requiring heat thus functions as a condenser for the remaining remote unit and the host unit 14. Controller 12' accomplishes this similar to modes M12 and M13, except the host liquid line 42 is opened by opening host liquid line solenoid valve LLS.

Mode M18 has the host unit 14 in cool while both remote units 24 and 24' are in heating modes. Thus, both remote evaporators 74 and 74' function as a condenser for the host evaporator 52.

What is claimed:

1. In a compartmentalized transport refrigeration system having a first refrigerant circuit which includes a compressor, a hot gas line, a condenser, a check valve, a receiver, a liquid line, an expansion valve, a host evaporator, and a suction line; a second refrigerant circuit which includes the compressor, the hot gas line, the host evaporator, and the suction line; refrigerant circuit selector valve means in the hot gas line having mutually exclusive cooling and heating mode positions which respectively connect the compressor to the first and second refrigerant circuits; a remote evaporator connected to the liquid, hot gas and suction lines via remote liquid, hot gas and suction lines, respectively, and a trailer having first and second compartments respectively served by the host and remote evaporators, the improvement comprising:

controllable valve means having open and close positions disposed in the liquid line of the first refrigerant circuit, in the hot gas line of the second refrigerant circuit, and in each of the remote liquid, hot gas and suction lines, refrigerant conduit means connecting the remote suction line to the receiver, with the connection point to the remote suction line being disposed between the remote evaporator and the controllable valve means in the remote suction line, said remote suction line including a check valve oriented to block refrigerant flow into the remote evaporator, with the connection point of the refrigerant conduit means to the remote suction line being disposed between said check valve and the controllable valve means in the remote suction line, and control means selecting the second refrigerant circuit via the heating mode position of the refrigerant selector valve means when the remote evaporator requires a heating mode, said control means closing the valve in the remote suction line when the host evaporator requires a heating mode, said control means closing the valve in the remote suction line when the host evaporator requires a cooling mode while the remote evaporator is in a heating mode, to return refrigerant from the remote evaporator to the compressor via the host evaporator, causing the remote evaporator to function as a condenser for the host evaporator and providing a cooling mode for the host evaporator, notwithstanding the refrigerant circuit selector valve means being in the heating mode position.

2. The transport refrigeration system of claim 1 wherein the refrigerant conduit means connecting the remote suction line to the receiver includes a check valve oriented to allow refrigerant flow into the receiver.

3. In a compartmentalized transport refrigeration system having a first refrigerant circuit which includes a compressor, a hot gas line, a condenser, a check valve, a receiver, a liquid line, an expansion valve, a host evaporator, and a suction line; a second refrigerant circuit which includes the compressor, the hot gas line, the host evaporator, and the suction line; refrigerant circuit selector valve means in the hot gas line having mutually exclusive cooling and heating mode positions which respectively connect the compressor to the first and second refrigerant circuits; a remote evaporator connected to the liquid, hot gas and suction lines via remote liquid, hot gas and suction lines, respectively, and a trailer having first and second compartments respectively served by the host and remote evaporators, the improvement comprising:

controllable valve means having open and close positions disposed in the liquid line of the first refrigerant circuit, in the hot gas line of the second refrigerant circuit, and in each of the remote liquid, hot gas and suction lines, refrigerant conduit means connecting the remote suction line to the receiver, with the connection point to the remote suction line being disposed between the remote evaporator and the controllable valve means in the remote suction line, said remote hot gas line being connected to the host hot gas line in the second refrigerant circuit, between the refrigeration circuit selector valve means and the host evaporator, and control means selecting the second refrigerant circuit via the heating mode position of the refrigerant selector valve means when the remote evaporator requires a heating mode, said control means closing the valve in the remote suction line when the host evaporator requires a cooling mode while the remote evaporator is in a heating mode, to return refrigerant from the remote evaporator to the compressor via the host evaporator, causing the remote evaporator to function as a condenser for the host evaporator and providing a cooling mode for the host evaporator, notwithstanding the refrigerant circuit selector valve means being in the heating mode position.

4. In a compartmentalized transport refrigeration system having a first refrigerant circuit which includes a compressor, a hot gas line, a condenser, a check valve, a receiver, a liquid line, an expansion valve, a host evaporator, and a suction line; a second refrigerant circuit which includes the compressor, the hot gas line, the host evaporator, and the suction line; refrigerant circuit selector valve means in the hot gas line having mutually exclusive cooling and heating mode positions which respectively connect the compressor to the first and second refrigerant circuits; first and second remote evaporators connected to the liquid, hot gas and suction lines via first and second remote liquid, hot gas and suction lines, respectively, and a trailer having first, second and third compartments respectively served by the host and first and second remote evaporators, the improvement comprising:

controllable valve means having open and close positions disposed in the liquid line of the first refrigerant circuit, in the hot gas line of the second refrigerant circuit, and in each of the first and second remote liquid, hot gas and suction lines, first and second refrigerant conduit means respectively connecting the first and second remote suction lines to the receiver, with the connection points to the first and second remote suction lines being disposed between the first and second remote evaporators and the controllable valve means in the first and second remote suction lines, said first and second remote suction lines each including a check valve oriented to block refrigerant flow into the first and second remote evaporators, with the connection points of the first and second refrigerant conduit means to the first and second remote suction lines being disposed between each of said check valves and the controllable valve means in the first and second remote suction lines, and control means selecting the second refrigerant circuit via the heating mode position of the refrigerant selector valve means when a remote evaporator requires a heating mode, said control means closing the valve in the remote suction line of the remote evaporator requiring heating when any one of the remaining evaporators requires a cooling mode while a remote evaporator is in a heating mode, to return refrigerant from the remote evaporator requiring heating to the compressor via the evaporator requiring cooling, causing the remote evaporator requiring heating to function as a condenser for the evaporator requiring cooling, and providing a cooling mode notwithstanding the refrigerant circuit selector valve means being in the heating mode position.

5. The transport refrigeration system of claim 4 wherein each of the refrigerant conduit means connecting the first and second remote suction lines to the receiver include a check valve oriented to allow refrigerant flow into the receiver.

6. In a compartmentalized transport refrigeration system having a first refrigerant circuit which includes a compressor, a hot gas line, a condenser, a check valve, a receiver, a liquid line, an expansion valve, a host evaporator, and a suction line; a second refrigerant circuit which includes the compressor, the hot gas line, the host evaporator, and the suction line; refrigerant circuit selector valve means in the hot gas line having mutually exclusive cooling and heating mode positions which respectively connect the compressor to the first and second refrigerant circuits; first and second remote evaporators connected to the liquid, hot gas and suction lines via first and second remote liquid, hot gas and suction lines, respectively, and a trailer having first, second and third compartments respectively served by the host and first and second remote evaporators, the improvement comprising:

controllable valve means having open and close positions disposed in the liquid line of the first refrigerant circuit, in the hot gas line of the second refrigerant circuit, and in each of the first and second remote liquid, hot gas and suction lines, first and second refrigerant conduit means respectively connecting the first and second remote suction lines to the receiver, with the connection points to the first and second remote suction lines being disposed between the first and second remote evaporators and the controllable valve means in the first and second remote suction lines, said first and second remote hot gas lines being connected to the host hot gas line in the second refrigerant circuit, between the refrigeration circuit selector valve means and the host evaporator, and control means selecting the second refrigerant circuit via the heating mode position of the refrigerant selector valve means when a remote evaporator requires a heating mode, said control means closing the valve in the remote suction line of the remote evaporator requiring heating when any one of the remaining evaporators requires a cooling mode while a remote evaporator is in a heating mode, to return refrigerant from the remote evaporator requiring heating to the compressor via the evaporator requiring cooling, causing the remote evaporator requiring heating to function as a condenser for the evaporator requiring cooling, and providing a cooling mode notwithstanding the refrigerant circuit selector valve means being in the heating mode position.

7. In a method of operating a transport refrigeration system having a first refrigerant circuit which includes a compressor, a hot gas line, a condenser, a receiver, a liquid line, an expansion valve, a host evaporator, and a suction line; a second refrigerant circuit which includes the compressor, the hot gas line, the host evaporator, and the suction line; refrigerant circuit selector valve means in the hot gas line having mutually exclusive cooling and heating mode positions which respectively connect the compressor to the first and second refrigerant circuits; and at least one remote evaporator connected to the liquid, hot gas and suction lines via remote liquid, hot gas and suction lines, respectively, the improvement comprising:

providing controllable valve means having open and close positions in at least the liquid line of the first refrigerant circuit, in the hot gas line of the second refrigerant circuit, and in each of the remote liquid, hot gas and suction lines, connecting the remote suction line to the receiver, with said connection to the remote suction line being between the remote evaporator and the controllable valve in the remote suction line, connecting the remote hot gas line to the host hot gas line in the second refrigerant circuit, between the refrigeration circuit selector valve means and the host evaporator, selecting the second refrigerant circuit via the heating mode position of the refrigerant selector valve means when the remote evaporator requires a heating mode, and closing the valve in the remote suction line when the host evaporator requires a cooling mode while the remote evaporator is in a heating mode, to return refrigerant from the remote evaporator to the compressor via the host evaporator, causing the remote evaporator to function as a condenser for the host evaporator and providing a cooling mode for the host evaporator, notwithstanding the refrigerant circuit selector valve means being in the heating mode position.

8. In a method of operating a transport refrigeration system having a first refrigerant circuit which includes a compressor, a hot gas line, a condenser, a receiver, a liquid line, an expansion valve, a host evaporator, and a suction line; a second refrigerant circuit which includes the compressor, the hot gas line, the host evaporator, and the suction line; refrigerant circuit selector valve means in the hot gas line having mutually exclusive cooling and heating mode positions which respectively connect the compressor to the first and second refrigerant circuits; and first and second remote evaporators connected to the liquid, hot gas and suction lines via first and second remote liquid, hot gas and suction lines, respectively, the improvement comprising:

providing controllable valve means having open and close positions in at least the liquid line of the first refrigerant circuit, in the hot gas line of the second refrigerant circuit, and in each of the first and second remote liquid, hot gas and suction lines, connecting the first and second remote suction lines to the receiver, with each of said connections to the first and second remote suction lines being between the first and second remote evaporators and the controllable valves in the first and second remote suction lines, connecting the first and second remote hot gas lines to the host hot gas line in the second refrigerant circuit, between the refrigeration circuit selector valve means and the host evaporator, selecting the second refrigerant circuit via the heating mode position of the refrigerant selector valve means when one of the first and second remote evaporators requires a heating mode, and closing the valve in the remote suction line of the remote evaporator requiring heating when another evaporator requires a cooling mode, to return refrigerant from the remote evaporator requiring heating to the compressor via the evaporator requiring cooling, causing the remote evaporator requiring heating to function as a condenser for the evaporator requiring cooling, providing a cooling mode for the host evaporator, notwithstanding the refrigerant circuit selector valve means being in the heating mode position.

* * * * *